United States Patent
Sudo

(10) Patent No.: US 6,300,751 B1
(45) Date of Patent: Oct. 9, 2001

(54) SWITCHING REGULATOR CONTROL CIRCUIT AVOIDING BREAK-DOWN OF THE SWITCHING ELEMENT

(75) Inventor: Minoru Sudo, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/638,198

(22) Filed: Aug. 11, 2000

(30) Foreign Application Priority Data

Oct. 27, 1999 (JP) ................................................. 11-305244

(51) Int. Cl.$^7$ ....................................................... G05F 5/00
(52) U.S. Cl. ............................ 323/299; 323/222; 323/285
(58) Field of Search .................................. 323/222, 282, 323/284, 285, 299, 351

(56) References Cited

U.S. PATENT DOCUMENTS

| | | | |
|---|---|---|---|
| 4,468,569 | * 8/1984 | Norris | 323/299 |
| 4,873,480 | * 10/1989 | Lafferty | 323/299 |
| 5,161,097 | * 11/1992 | Ikeda | 323/222 |
| 5,682,305 | * 10/1997 | Kurokami et al. | 323/299 |

* cited by examiner

Primary Examiner—Jeffrey Sterrett
(74) Attorney, Agent, or Firm—Adams & Wilks

(57) ABSTRACT

When an output impedance of an input power supply for a switching regulator is high, damages caused by a large current are suppressed which are given to switch elements employed in a power supply circuit and the switching regulator. In a step-up type switching regulator control circuit comprising at least an error amplifying circuit and a drive circuit of a switch element and producing an output voltage higher than an input voltage, the error amplifying circuit is operated by the input voltage; the drive circuit of the switch element is operated by the output voltage; the step-up type switching regulator control circuit is further comprised of a voltage detecting circuit operated by the output voltage; the voltage detecting circuit detects the input voltage, and when the input voltage is decreased lower than an arbitrary voltage, the voltage detecting circuit causes the drive circuit of the switch element to produce such a signal capable of firmly turning OFF the switch element.

4 Claims, 9 Drawing Sheets

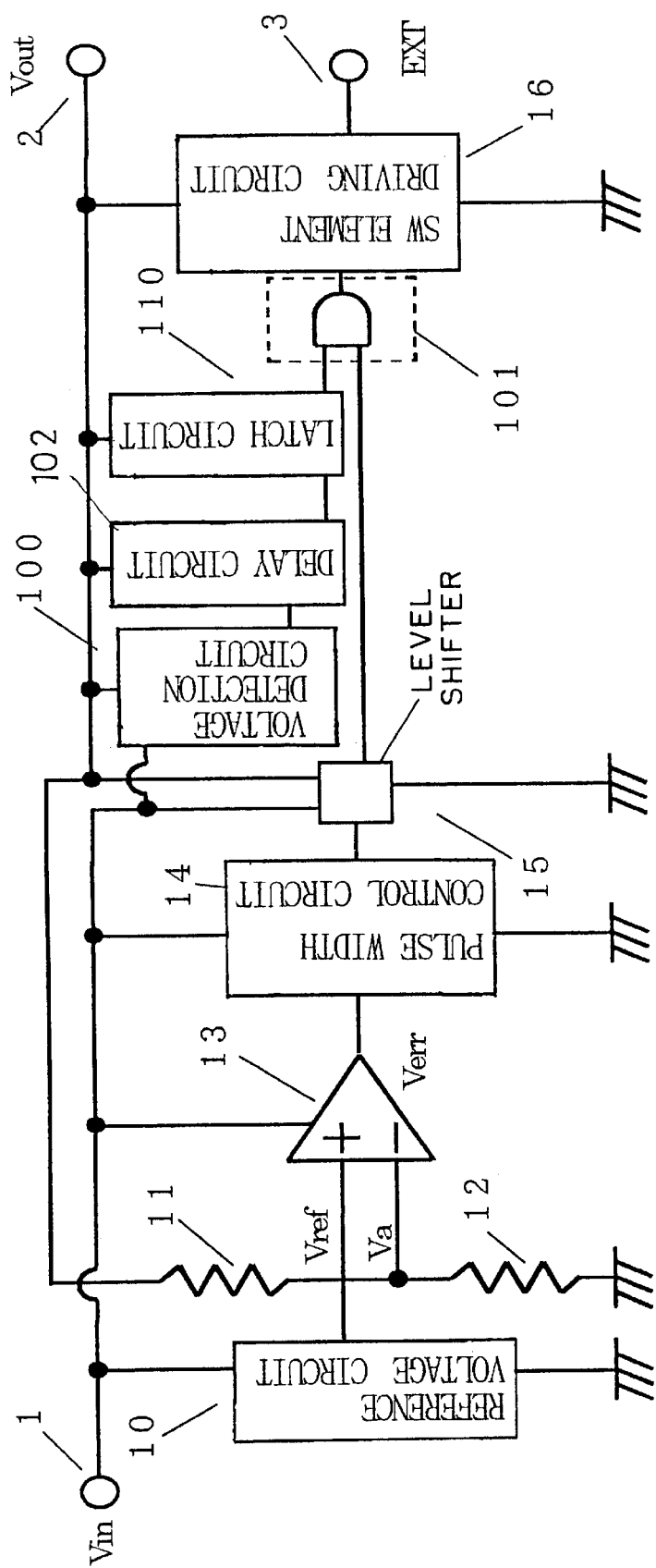
F I G. 5

PRIOR ART FIG. 6

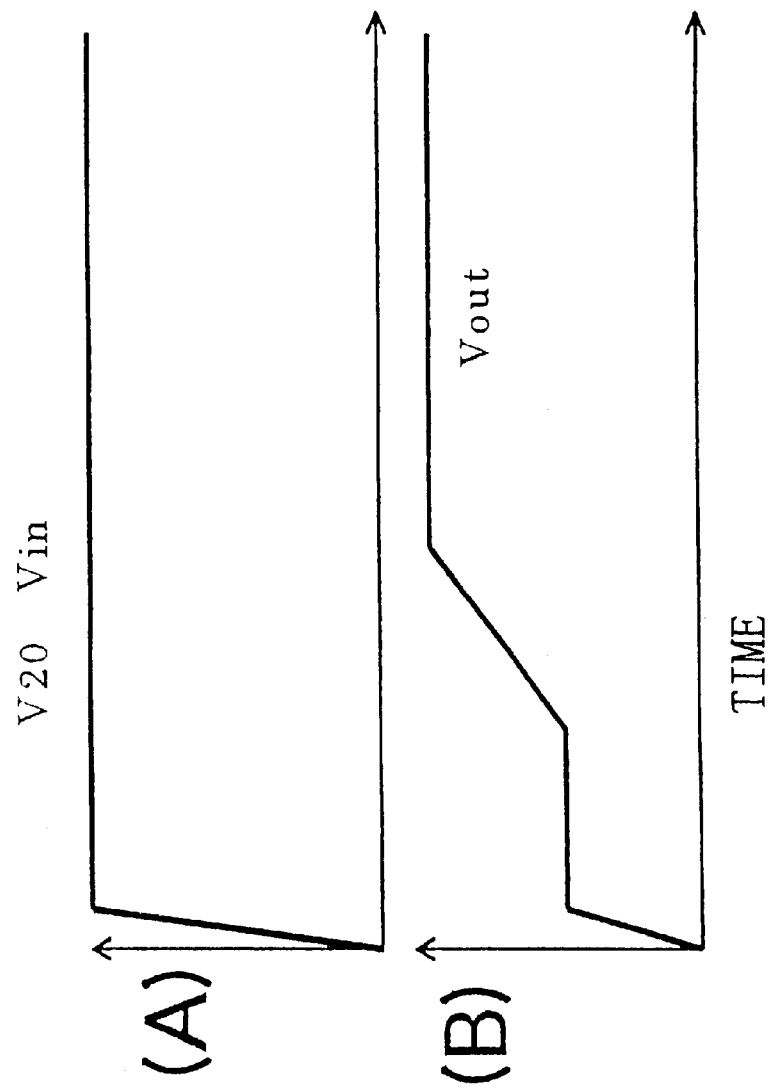

PRIOR ART FIG. 9
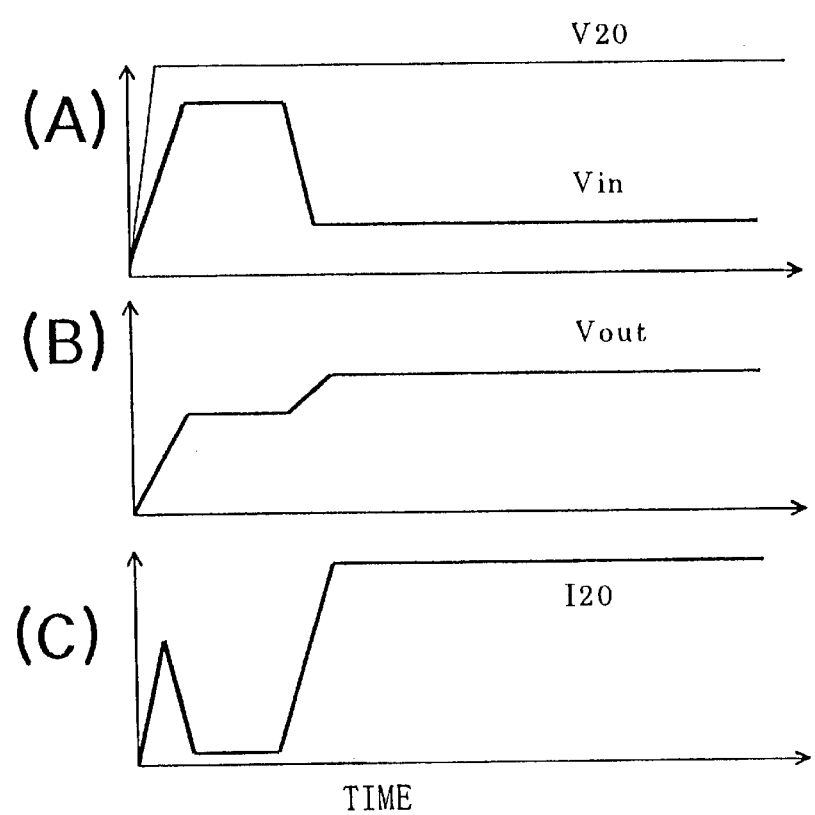

SWITCHING REGULATOR CONTROL CIRCUIT AVOIDING BREAK-DOWN OF THE SWITCHING ELEMENT

BACKGROUND OF THE INVENTION

1. Field of the Invention

The present invention generally relates to a switching regulator control circuit. More specifically, the present invention is directed to a regulator control circuit capable of avoiding such a fact that when an impedance of an input power supply of a switching regulator is increased, a switch element is continuously turned ON and thus, a large current flows through a power supply and the switch element to thereby break down this switch element.

2. Description of the Related Art

FIG. 6 is a circuit diagram for representing one of the conventional switching regulator (SW regulator) control circuits. That is, there is provided an error amplifying circuit 13 which amplifies a difference voltage between a reference voltage "Vref" of a reference voltage circuit 10 and a voltage "Va" appeared at a junction point between a bleeder resistor 11 and a bleeder resistor 12. The bleeder resistors 11/12 sub-divide an output voltage "Vout" of an output terminal 2 of an SW regulator. Assuming now that the output voltage of the error amplifier circuit 13 is "Verr", the output voltage of the reference voltage circuit 10 is "Vref", and the voltage appeared at the junction point between the bleeder resistor 11 and the bleeder resistor 12 is "Va", if Vref>Va, then the output voltage "Verr" of the error amplifier circuit 13 is increased, whereas if Vref<Va, then this output voltage "Verr" is decreased. A pulse width control circuit 14 which enters the output voltage "Verr" of the error amplifying circuit 13 as an input signal controls the ON time of the switch element (SW element) and the OFF time thereof in response to a value of this output voltage "Verr". The SW element is connected to an SW element drive circuit 16 so as to be turned ON/OFF.

The SW element drive circuit 16 is operated while the output voltage "Vout" is used as the power supply. The reference voltage circuit 10, the error amplifying circuit 13, and the pulse width control circuit 14 are operated while the voltage "Vin" of the input terminal 1 is used as the power supply. When a power MOS transistor is employed, for instance, as the SW element of the SW element drive circuit, if a high drive voltage (namely, gate-to-source voltage) is used, then the ON resistance of this power MOS transistor may be lowered. As a result, when the SW element drive circuit is driven by employing the boosted output voltage "Vout", the efficiency of the SW regulator may be increased. A level shifter (will be referred to as an "L/S" hereinafter) 15 is employed between the pulse width control circuit 14 and the SW element drive circuit 16, and converts a signal derived from the pulse width control circuit 14 of the Vin-power supply system into a signal level of the SW element drive circuit 16 of the Vout-power supply system having the different power supply voltage from that of the Vin-power supply system.

FIG. 7 shows an example of a step-up type SW regulator. In this SW regulator, both a coil 21 and an SW regulator control circuit 30 are connected to an input power supply 20. A rectifying element 23 is connected between the coil 21 and an output capacitor 24. A load 25 is connected parallel to the output capacitor 24. In general, an output impedance 26 of the input power 20 is low, and therefore is negligible. However, in the case that an extraordinary condition happens to occur in the input power supply 20, this output impedance 26 will have a certain impedance value. Also, when a cell and the like are employed as the input power supply 20, the input power supply 20 will have an impedance value of approximately several Ω to ten Ω.

FIG. 8 indicates a waveform produced when the power supply is turned ON in such a case that the impedance 26 of the input power supply 20 of FIG. 7 is negligibly small. FIG. 8(a) shows both a voltage "V20" of the power supply 20 of FIG. 7 and a power supply voltage "Vin" of the SW regulator control circuit 30, and FIG. 8(b) represents an output voltage "Vout" of the SW regulator. In these drawings, abscissas denote time. Since the impedance 26 of the input power supply 20 is negligibly small, the waveform of "V20" is overlapped with the waveform of "Vin" in FIG. 8(a). The reason why the output voltage "Vout" of FIG. 8(b) is gradually increased is caused by a soft starting function of the SW regulator control circuit. This soft starting function is such a function that the output voltage is gradually increased in order that an overshoot phenomenon is not produced in the output voltage "Vout" when the power supply is turned ON. This soft starting function is not described in this specification.

FIG. 9 shows a waveform produced when the power supply is turned ON in the case that the impedance 26 of the input power supply 20 of FIG. 7 is on the order of several Ω. FIG. 9(a) shows a voltage "V20" of the input power supply 20 and a power supply voltage "Vin" of the SW regulator control circuit 30 in FIG. 7, FIG. 9(b) represents an output voltage "Vout" of the SW regulator, and FIG. 9(c) denotes a current "I20" of the input power supply 20. In FIG. 9(a) to FIG. 9(c), abscissas show time. When a current flows through the input power supply 20 by the impedance 26 of the input power supply 20, the power supply voltage "Vin" of the SW regulator control circuit is decreased. In FIG. 9, while the SW regulator is operated in the step-up operation, a current flows through the input power supply 20. As a result, the input voltage "Vin" of the SW regulator control circuit 30 is decreased lower than, or equal to the operation voltage of the SW regulator control circuit 30, so that the SW regulator control circuit 30 cannot be operated under normal condition. Thus, FIG. 9 represents such a condition that the output of the SW element drive circuit continuously turns ON the SW element. For example, in such a case that the value of the output voltage "V20" of the input power supply 20 is 2 V, the value of the output impedance 26 is 1.5 Ω, and a current of 1 A flows through the input power supply 20 when the power supply is turned ON, the input voltage "Vin" of the SW regulator control circuit 30 is decreased up to 0.5 V. Assuming now that the minimum operation voltage of the SW regulator control circuit 30 is selected to be 1 V, the SW regulator control circuit 30 cannot be operated in the normal mode under this low-voltage condition, and also the output of the L/S 15 of FIG. 6 becomes uncertain. As a result, when the voltage of the EXT terminal of the output of the SW element drive circuit 16 is stopped under such a condition that the SW element 22 of FIG. 7 is turned ON, a large current continuously flows through the input power supply 20, the coil 21, and the SW element 22. Thus, there is such a risk that these circuit elements are deteriorated, and will be broken down in the worst case.

However, in the conventional SW regulator, when the output impedance of the input power supply is increased, the following problem will occur. That is, while the SW regulator is operated under step-up operation, the power supply voltage of the SW regulator control circuit is lowered, the SW regulator control circuit cannot be operated under normal condition, and the SW element is continuously turned ON, so that the large current flows through the power supply circuit and the SW element, which may give damages to these circuit elements.

SUMMARY OF THE INVENTION

The present invention has been made to solve such a problem of the conventional SW regulator control circuit, and therefore, has an object to provide an SW regulator control circuit in which a voltage detecting circuit operable by an output voltage is provided, a voltage of an input power supply is detected by this voltage detecting circuit, and when the voltage of the input power supply is decreased lower than the operation voltage of the SW regulator control circuit, an SW element is firmly turned OFF. As a consequence, this SW regulator control circuit can suppress both a current of the power supply and a switching current, namely a current flowing through a switch element employed in the SW regulator.

To achieve the above-described object, a switching regulator control circuit, according to an aspect of the present invention, is featured by such a step-up type switching regulator control circuit comprising at least an error amplifying circuit and a drive circuit of a switch element, for producing an output voltage higher than an input voltage, wherein: the error amplifying circuit is operated by the input voltage; the drive circuit of the switch element is operated by the output voltage; the step-up type switching regulator control circuit is further comprised of a voltage detecting circuit operated by the output voltage; the voltage detecting circuit detects the input voltage, and when the input voltage is decreased lower than an arbitrary voltage, the voltage detecting circuit causes the drive circuit of the switch element to produce such a signal capable of firmly turning OFF the switch element.

As a consequence, when the voltage detecting circuit detects such a fact that the input voltage of the power supply is decreased lower than the operation voltage of the SW regulator control circuit, the SW element can be firmly turned OFF, so that increasing of both the power supply current and the switching current can be suppressed.

BRIEF DESCRIPTION OF THE DRAWINGS

For a better understanding of the present invention, reference is made of a detailed description to be read in conjunction with the accompanying drawings, in which:

FIG. 5 is an explanatory diagram for explaining a switching regulator control circuit of a fourth embodiment of the present invention;

FIG. 8 is the operation explanatory diagram of the conventional switching regulator when the output impedance of the input power supply is small; and FIG. 9 is the operation explanatory diagram of the conventional switching regulator when the output impedance of the input power supply is large.

DETAILED DESCRIPTION OF THE PREFERRED EMBODIMENTS

Referring now to drawings, various embodiment modes of the present invention will be described in detail.

Figure 1:
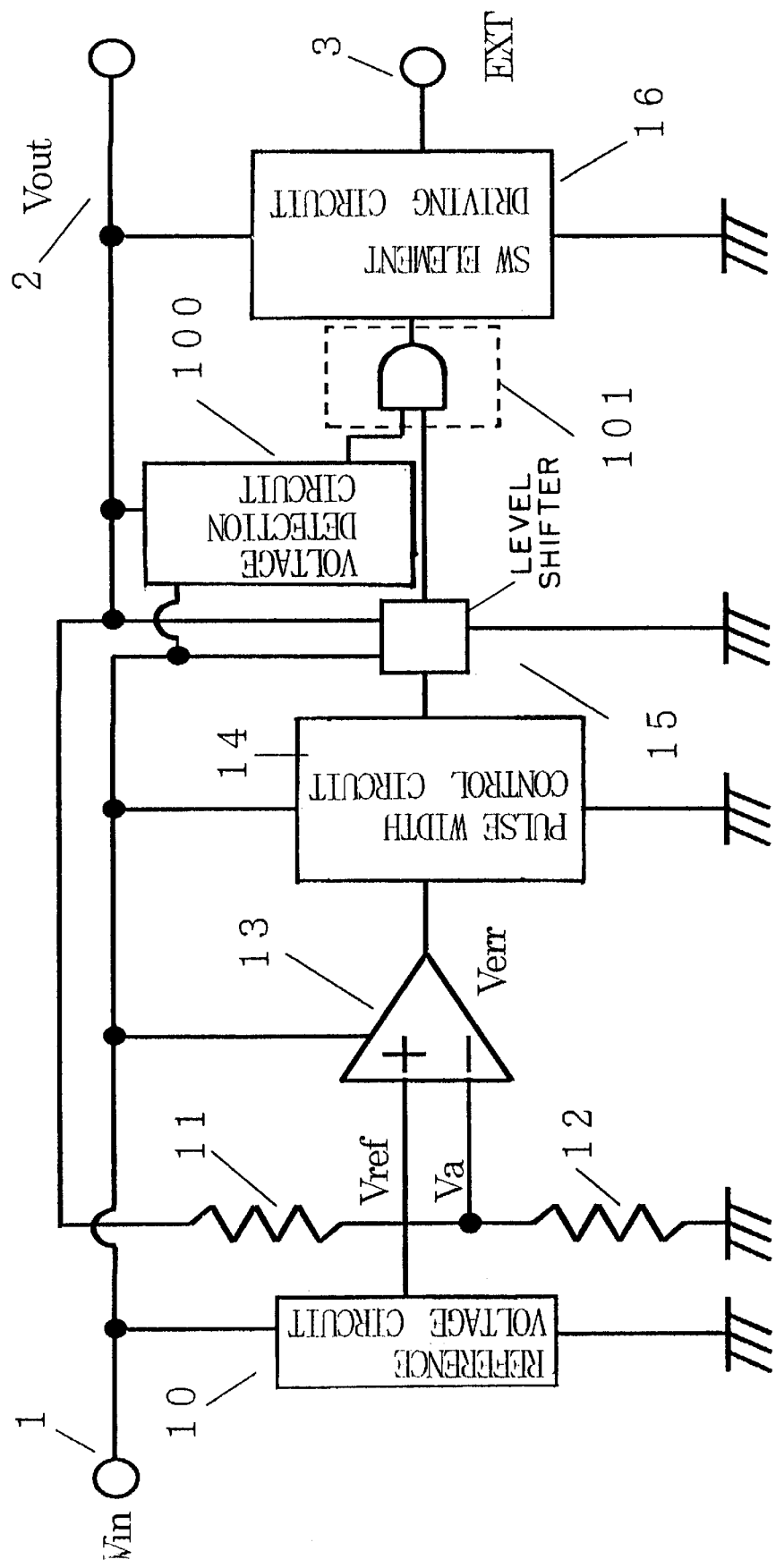
FIG. 1 is an explanatory diagram for explaining a switching regulator control circuit according to a first embodiment of the present invention.

FIG. 1 is a circuit block diagram for showing an SW regulator control circuit according to a first embodiment of the present invention. In this drawing, a reference voltage circuit 10, bleeder resistors 11/12, an error amplifying circuit 13, a pulse width control circuit 14, an L/S (level shifter) 15, and an SW element drive circuit 16 are similar to those of the conventional SW regulator. A voltage detecting circuit 100 is newly added to this first SW regulator control circuit. While the voltage detecting circuit 100 is operated by using an output voltage "Vout" of an SW regulator as a power supply, this voltage detecting circuit 100 detects as to whether or not a power supply voltage "Vin" of the SW regulator control circuit is decreased lower than, or equal to the operation voltage of the SW regulator control circuit. A logic calculating circuit 101 logically calculates the output signal of the L/S 15 and the output signal of the voltage detecting circuit 100, and then outputs the logic-calculation result signal to the SW element drive circuit 16.

Now, the following assumption is made. For instance, in the case that the power supply voltage "Vin" of the SW regulator control circuit is higher than, or equal to the operation voltage of the SW regulator control circuit, the voltage detecting circuit 100 outputs an "H", whereas in the case that the power supply voltage "Vin" of the SW regulator control circuit is lower than the operation voltage of the SW regulator control circuit, the voltage detecting circuit 100 outputs an "L" level. When the output of the voltage detecting circuit 100 becomes "H", the output of the L/S 15 constitutes an input signal of the SW element drive circuit similar to the conventional SW regulator control circuit. When the output of the voltage detecting circuit 100 becomes "L", the SW regulator control circuit outputs such an output signal to an EXT terminal 3 in such a manner that the SW element drive circuit 16 necessarily turns OFF the SW element irrespective of the output signal of the level shifter 15. In other words, in the case that the power supply voltage "Vin" of the SW regulator control circuit is higher than, or equal to the voltage set by the voltage detecting circuit 100, the SW regulator control circuit is operated in a similar manner to that of the prior art.

Figure 2:
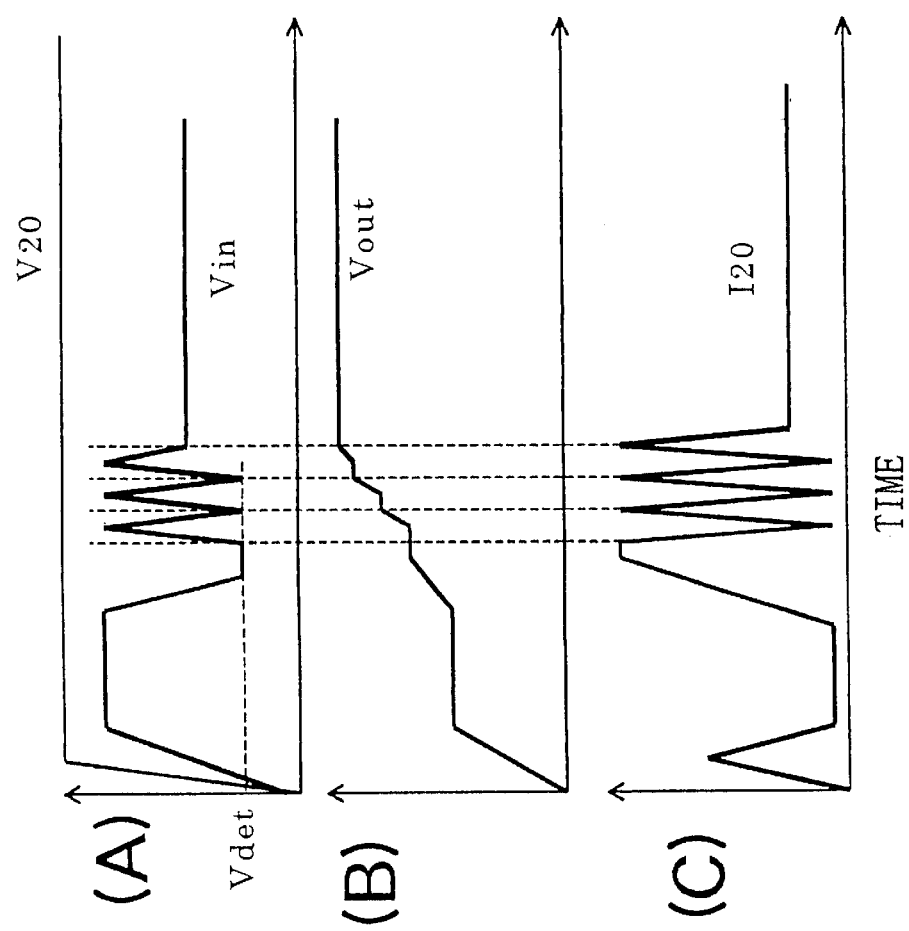
FIG. 2 is an operation explanatory diagram for explaining operation of an SW regulator using the switching regulator control circuit of the first embodiment of FIG. 1.
Figure 6:
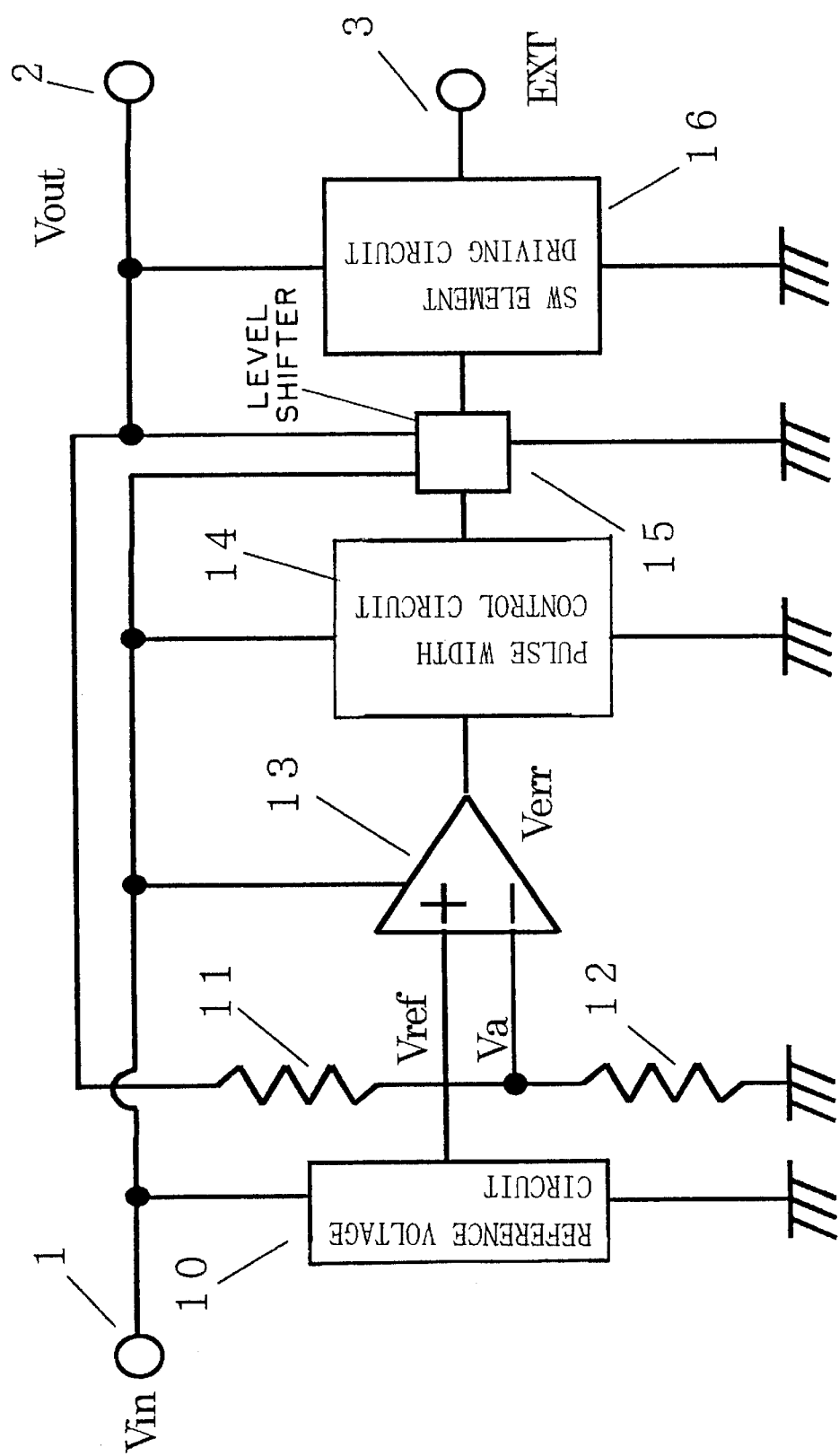
FIG. 6 is an explanatory diagram for describing the conventional switching regulator control circuit.

FIG. 2 represents a waveform of various voltages when the power supply of the SW regulator circuit shown in FIG. 6 is turned ON in such a case that an input power supply owns a certain impedance value while the SW regulator control circuit according to the first embodiment of the present invention shown in FIG. 1 is employed in the SW regulator control circuit 30. FIG. 2(a) shows both a voltage "V20" of the power supply 20 of FIG. 6 and a power supply voltage "Vin" of the SW regulator control circuit 30, and FIG. 2(b) represents an output voltage "Vout" of the SW regulator. FIG. 2(c) shows a current "I20" of the input power supply 20. In these drawings, abscissas denote time.

Figure 7:
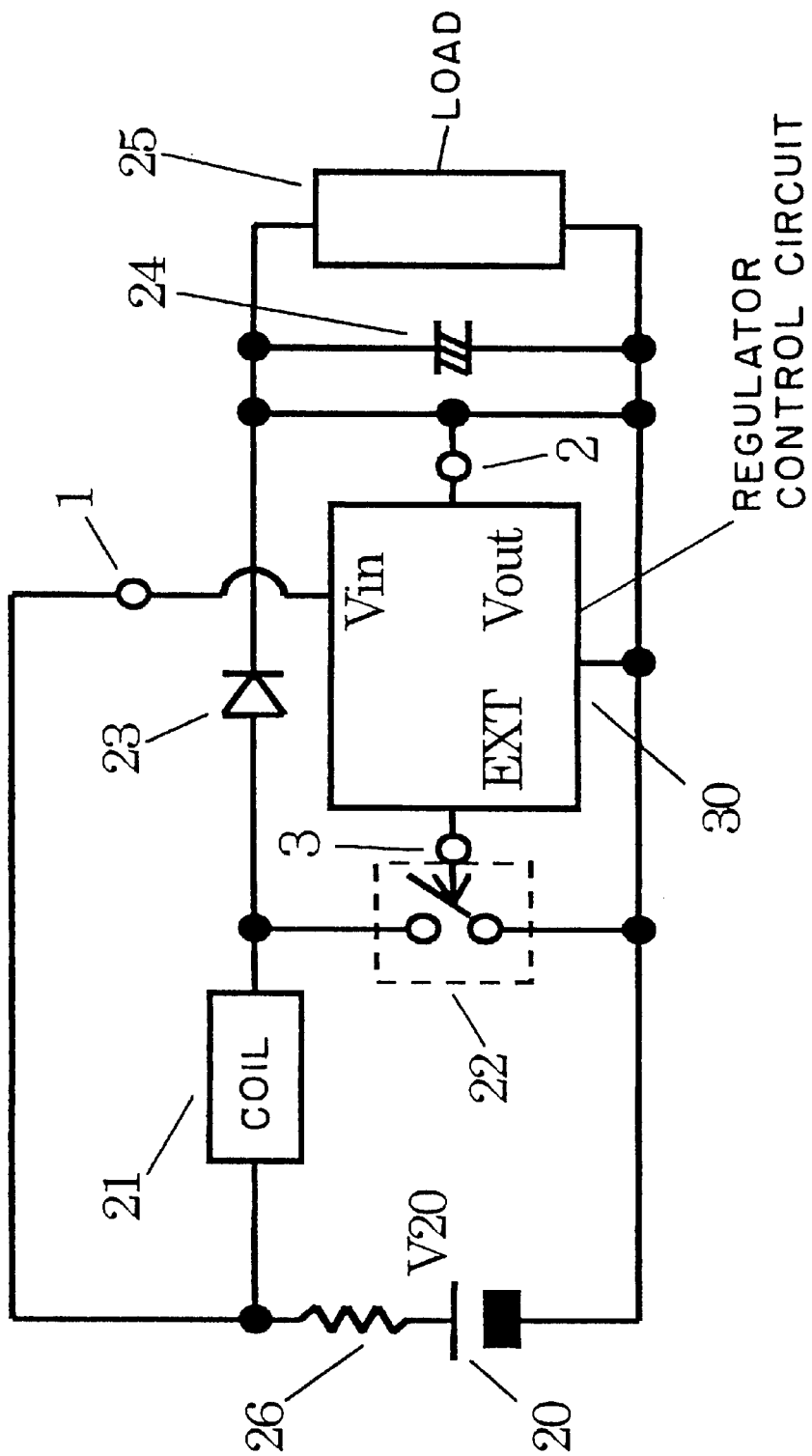
FIG. 7 is an explanatory diagram for explaining the step-up type switching regulator.

Symbol "Vdet" indicated in FIG. 2(a) represents a detection voltage value of the voltage detecting circuit 100. When a current flows through the power supply 20 by the impedance 26 of the input power supply 20, the power supply voltage "Vin" of the SW regulator control circuit 30 is lowered. When the power supply voltage "Vin" is decreased lower than the operation voltage of the SW regulator control circuit 30 (namely, lower than detection voltage "Vdet" of voltage detecting circuit 100), the output signal of the voltage detecting circuit 100 becomes "L", so that the SW element 22 is necessarily turned OFF. Assuming now that the power supply voltage "Vin" is decreased up to approximately 0.5 V, since the output voltage "Vout" is maintained due to the electron charges stored in the capacitor 24 of FIG. 7, the voltage detecting circuit 100 of FIG. 1 driven by the output voltage "Vout" can be operated under normal condition.

When the SW element 22 is turned OFF, the current of the input power supply 20 is decreased and then the power supply voltage "Vin" of the SW regulator control circuit 30. When the power supply voltage "Vin" of the SW regulator control circuit 30 is increased, the output signal of the voltage detecting circuit 100 becomes "H", and thus, turning ON/OFF of the SW element 22 is controlled based upon the output signal derived from the L/S 15. Since the SW element 22 is again turned ON, a current flows through the input power supply 20 and thus, the power supply voltage "Vin" of the SW regulator control circuit is lowered, which is repeatedly carried out. Eventually, the output voltage "Vout" is increased up to a desirable voltage.

There are some cases that the output voltage "Vout" cannot be increased up to a desirable voltage, depending upon a load of the SW regulator. However, contrary to the conventional SW regulator, a large current does not continuously flow, because the SW element is continuously turned ON.

Figure 3:
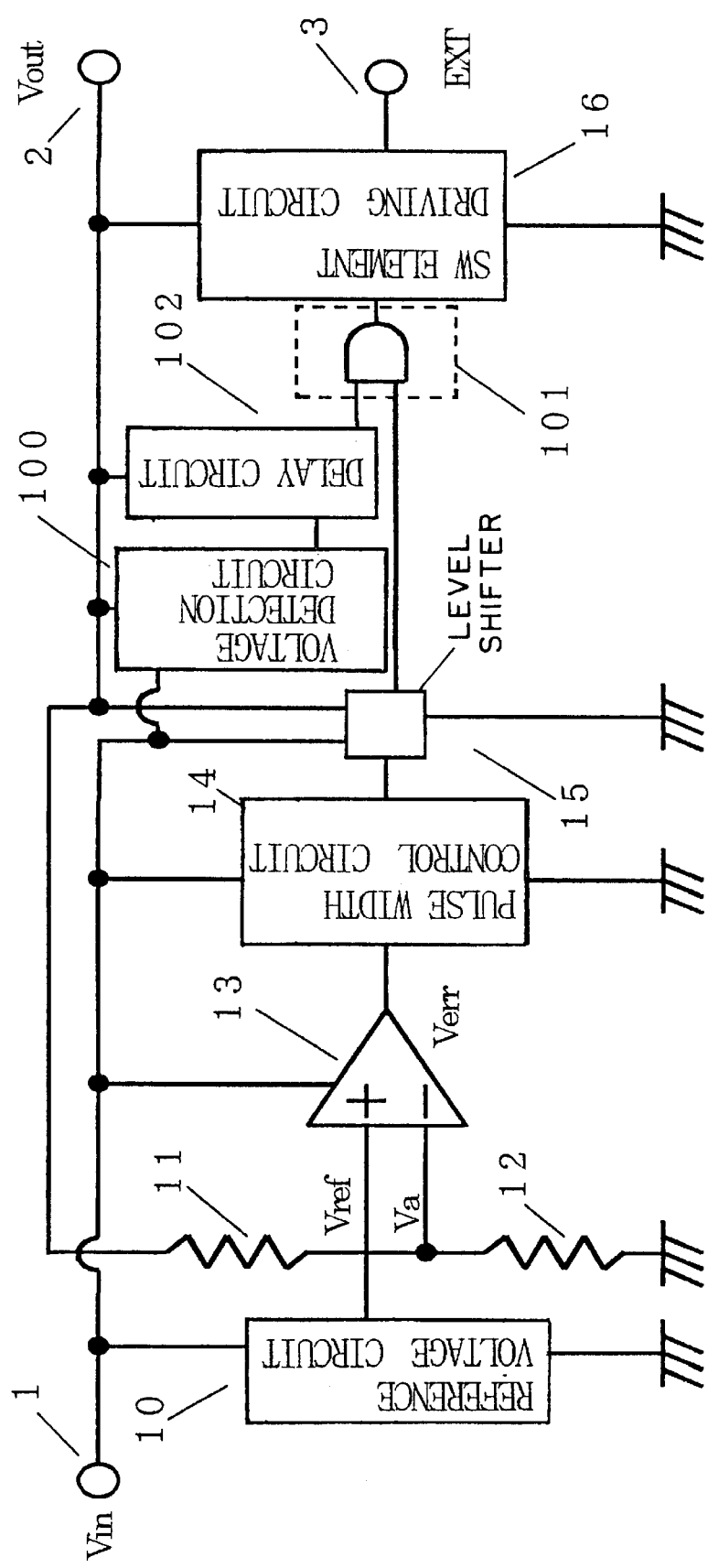
FIG. 3 is an explanatory diagram for explaining a switching regulator control circuit according to a second embodiment of the present invention.

FIG. 3 is a circuit diagram for indicating an SW regulator control circuit according to a second embodiment of the present invention. This second SW regulator control circuit owns such a different point that a delay circuit 102 is added to the output of the voltage detecting circuit 100, as compared with that of FIG. 1. The delay circuit 102 outputs an output signal to the EXT terminal 3 in such a manner that when the voltage detecting circuit 100 keeps the detection condition for a time period longer than, or equal to arbitrary time. Since the delay circuit 102 is additionally employed, the SW element drive circuit 16 is controlled only by the signal derived from the level shifter 15 under such a condition. That is, even if the voltage detecting circuit 100 detects such a fact that the input voltage "Vin" is temporarily lowered by a rapid load variation, and/or the input voltage "Vin" is instantaneously lowered by noise produced by the SW regulator itself, the SW element drive circuit 16 is controlled only by the signal of the level shifter 15 unless this voltage detecting circuit 100 detects it during a certain time period. In other words, the second SW regulator control circuit can avoid the erroneous detection by the voltage detecting circuit 100 due to noise or the like.

Figure 4:
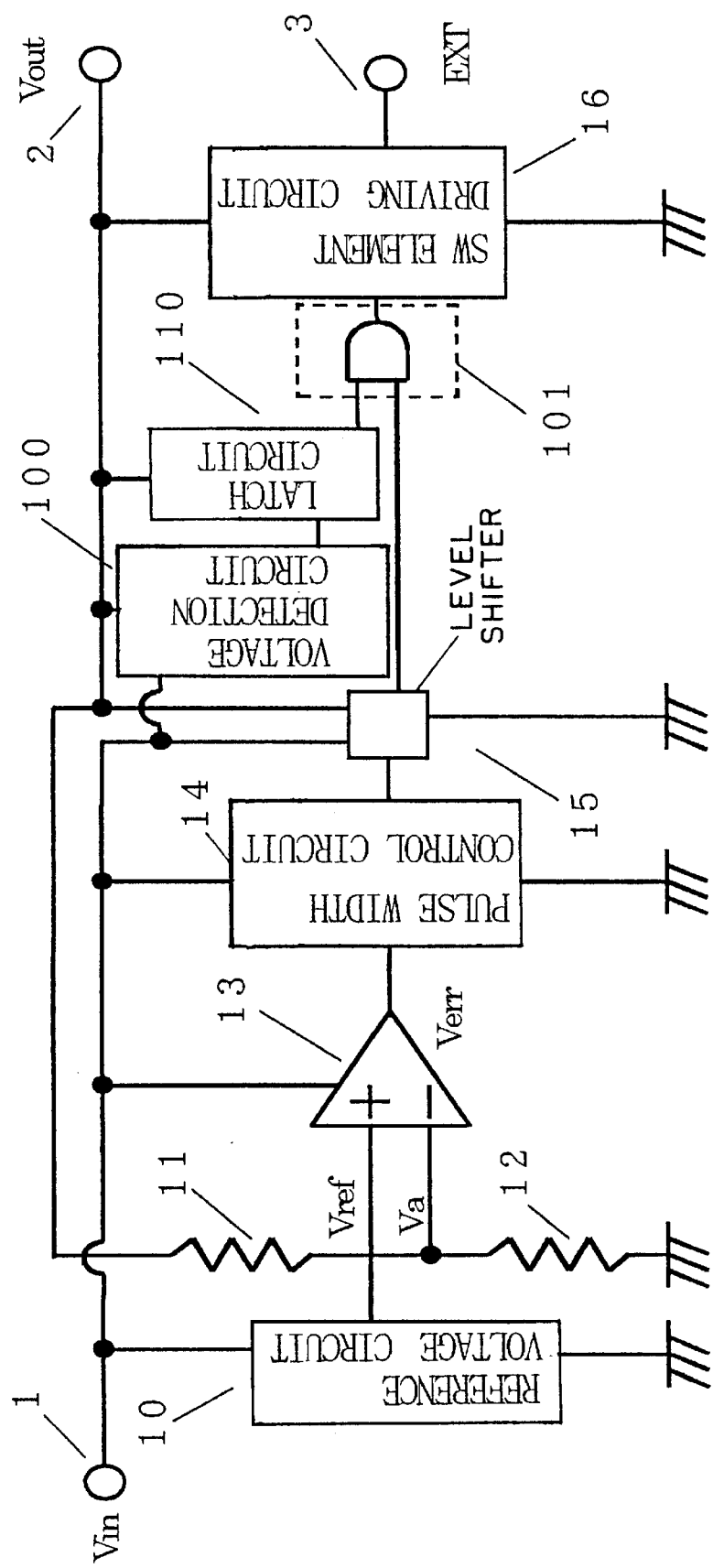
FIG. 4 is an explanatory diagram for explaining a switching regulator control circuit of a third embodiment of the present invention.

FIG. 4 is a circuit diagram for indicating an SW regulator control circuit according to a third embodiment of the present invention. This third SW regulator control circuit owns such a different point that a latch circuit 110 is added to the output of the voltage detecting circuit 100, and this latch circuit 110 is operated by the output voltage, as compared with that of FIG. 1. Once the voltage detecting circuit 100 detects a voltage, the latch circuit 110 holds this condition, and continuously outputs such an output signal to the EXT terminal 3 that the SW element drive circuit 16 continuously turns OFF the SW element. The latch circuit 110 may be reset even when a reset signal is supplied from an external circuit thereto while the SW regulator is operated, otherwise even when a reset signal is supplied by increasing an output voltage of the SW regulator itself when the power supply is connected. In the case of FIG. 1, when the voltage detecting circuit 100 detects lowering of the input power supply voltage, the SW element is turned OFF, so that the input power supply voltage is again increased and then the voltage detecting circuit 100 releases the voltage detection. A series of this operation is repeatedly carried out. To the contrary, in the case of FIG. 4, once the voltage detecting circuit 100 detects lowering of the input power supply voltage, the latch circuit 110 is activated, so that the SW element is continuously turned OFF unless the reset signal is applied to the latch circuit 110.

FIG. 5 is a circuit diagram for indicating an SW regulator control circuit according to a fourth embodiment of the present invention. This fourth SW regulator control circuit owns such a different point that a latch circuit 110 is added to the output of the delay circuit 102, and this latch circuit 110 is operated by the output voltage, as compared with that of FIG. 3. Once the delay circuit 102 detects a voltage, the latch circuit 110 holds this condition, and continuously outputs such an output signal to the EXT terminal 3 that the SW element drive circuit 16 continuously turns OFF the SW element. The latch circuit 110 may be reset even when a reset signal is supplied from an external circuit thereto while the SW regulator is operated, otherwise even when a reset signal is supplied by increasing an output voltage of the SW regulator itself when the power supply is connected. In the case of FIG. 4, since no delay circuit is provided at the output detecting circuit 100, once the voltage detecting circuit 110 erroneously detects lowering of the input power supply voltage due to noise, the SW element is continuously turned OFF unless the latch circuit 110 is reset. To the contrary, in the case of FIG. 5, since the voltage detecting circuit 100 is latched by the output of the delay circuit 102, it is possible to avoid stopping of the operation of the SW regulator by the erroneous detection by the voltage detecting circuit 100.

As previously described, the SW regulator control circuit, according to the present invention, is operated as follows. In the case that the output impedance of the input power supply is high, even when the input voltage of the SW regulator control circuit is decreased lower than, or equal to the operation voltage of this SW regulator control circuit while the SW regulator is operated, the SW element can be firmly turned OFF. As a consequence, there are such effects that no large current continuously flows through the switch element employed in the SW regulator and also the switch element provided in the power supply circuit, and the damages given to the power supply circuit and the switch element can be suppressed.

What is claimed is:

1. A step-up type switching regulator control circuit comprising at least an error amplifying circuit and a drive circuit of a switch element, for producing an output voltage higher than an input voltage, wherein:

said error amplifying circuit is operated by the input voltage;

said drive circuit of the switch element is operated by the output voltage;

said step-up type switching regulator control circuit is further comprised of a voltage detecting circuit operated by the output voltage;

said voltage detecting circuit detects the input voltage, and when the input voltage is decreased lower than an arbitrary voltage, said voltage detecting circuit causes said drive circuit of said switch element to produce such a signal capable of firmly turning OFF the switch element.

2. A switching regulator control circuit as claimed in claim 1 wherein:
said switching regulator control circuit is further comprised of:
a delay circuit employed at the output of said voltage detecting circuit, said delay circuit being operable by the output voltage.

3. A switching regulator control circuit as claimed in claim 1 wherein:
said switching regulator control circuit is further comprised of:
a latch circuit employed at the output of said voltage detecting circuit, said latch circuit being operable by the output voltage.

4. A switching regulator control circuit as claimed in claim 2 wherein:
said switching regulator control circuit is further comprised of:
a latch circuit employed at the output of said delay circuit, said latch circuit being operable by the output voltage.

* * * * *